T. THOMAS.
PIPE TONGS.
APPLICATION FILED APR. 19, 1919.
1,370,931. Patented Mar. 8, 1921.
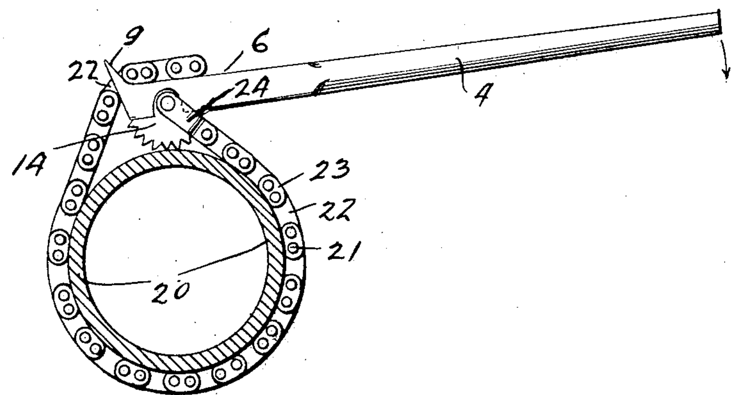
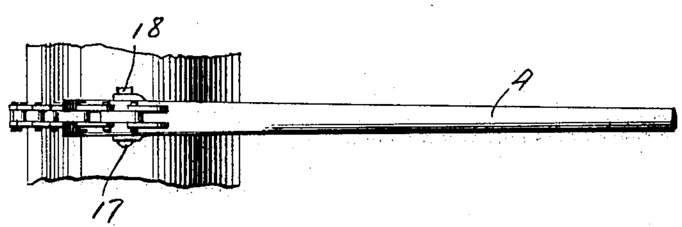
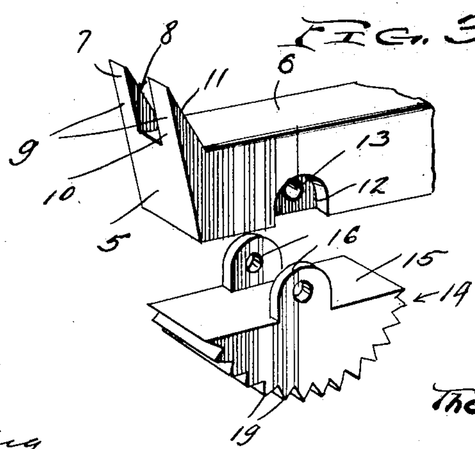
Witnesses
Inventor
Thomas Thomas
By Richard B. Owen,
Attorney

UNITED STATES PATENT OFFICE.

THOMAS THOMAS, OF BAYONNE, NEW JERSEY.

PIPE-TONGS.

1,370,931. Specification of Letters Patent. Patented Mar. 8, 1921.

Application filed April 19, 1919. Serial No. 291,285.

*To all whom it may concern:*

Be it known that I, THOMAS THOMAS, a citizen of the United States, residing at Bayonne, in the county of Hudson and State of New Jersey, have invented certain new and useful Improvements in Pipe-Tongs, of which the following is a specification.

My invention relates to new and useful improvements in pipe tongs, and more particularly to that type employing a flexible element which is adapted to securely embrace the member to be rotated by the tongs.

An important object of the invention resides in the provision of the particular arrangement of the various parts of the tongs, whereby the flexible element may be securely engaged with the member to be rotated thereby causing the flexible element to gain secure locking contact with the rotatable member.

Another object of my invention resides in the provision of a device of the above mentioned character which may be used in connection with pipes of various sizes or diameters.

Still another object of the invention resides in the provision of a handle having means on the top of one end thereof for detachably engaging one end of the flexible element, while the bottom of the free end of the handle is provided with means rigidly secured to the handle for engagement with a pipe.

Another object of my invention is to provide a device which is strong, durable, inexpensive to manufacture, and efficient in practice.

Other objects and advantages of the invention will become apparent during the course of the following description.

In the drawings, forming a part of the description, and wherein like numerals are employed to designate like parts throughout the same, Figure 1 is a side elevation of the invention as applied to a pipe.

Fig. 2 is a top plan of the same, and

Fig. 3 is an enlarged detailed perspective view of one end of the handle and the toothed segment which is rigidly secured to this end of the handle.

In the drawings, wherein for the purpose of illustration is shown a preferred embodiment of my invention the numeral 4 designates a handle of sufficient length to give excellent leverage to the invention. As more clearly illustrated in Fig. 3 of the drawings, the outer free end of the handle is inclined as at 5 for a purpose to hereinafter appear. The upper face 6 of the handle or the top thereof, is provided at the outermost end thereof with an upstanding lug 7, which is bifurcated longitudinally of the handle as at 8 to provide a pair of spaced arms 9. The front faces 10 and rear faces 11 of these arms are inclined upwardly in converging relationship so that the arms 9 incline slightly forwardly of the end of the handle 4. As clearly shown, the outer faces 10 of the arms are contiguous with the outer end 5 of the handle whereby the entire end of the handle is inclined.

In each opposite side of the handle adjacent the free end 5, and extending from the lower edges of the side, I provide a substantially semi-circular recess 12. An opening 13 extends transversely through the handle and communicates with each recess 12 for a purpose which will presently appear.

A toothed segment 14 having a flat upper face 15, is provided with a pair of spaced upwardly extending perforated ears 16 to be received in the oppositely disposed recesses 12. A bolt 17 extends through the perforated ears 16 and the openings 13 in the handle to rigidly secure the flat face 15 of the toothed segment in close engagement with the lower face or bottom of the free end of the handle 4. As usual, a nut 18 is threaded upon the screw threaded end of the bolt 17 for detachably retaining the bolt in the above stated position. The convex face of the segment is provided with a plurality of transversely extending teeth 19 which facilitate the tongs obtaining a more severe grip upon the element to be rotated.

The flexible element 21, in the present instance is illustrated in the form of a chain having alternate solid links 22 which are separated by links 23, which links consist of a pair of spaced plates pivoted to the alternate solid links 22. The end links 24 on one end of the chain consist of a pair of relatively spaced plates so that one plate may be pivotally mounted upon the bolt 17 on the opposite outsides of the toothed segment 14, as more clearly shown in Fig. 1. The link 24 is of such size to permit passage of the toothed segment therethrough so that the flexible element 21 may pivot upon the bolt to accommodate pipes of various sizes. The opposite end of the chain 21 is free as clearly shown.

To place the tongs in binding engagement with the pipe 20, the handle 4 is positioned substantially vertically of the pipe and the free end of the chain is flexed to embrace the pipe. When the implement is in this position, it will be clearly seen that the arms 9 will be in closer proximity to the periphery of the pipe than they are as shown in Fig. 1. The portion of the chain which is adjacent the arms 9 is passed into the bifurcation 8 which forms the two arms 9 so that one of the links, smallest in width, is arranged between the arms 9 whereby the plates of the links largest in width abut with the inner sides 11 of the arms 9 to prevent the free end of the chain from becoming disengaged with the handle. Having attained this adjustment, the handle 4 is forced downwardly in the direction of the arrow illustrated in Fig. 1, which action will cause the chain to bind more firmly upon the periphery of the pipe, or in other words tighten upon the pipe so that the handle 4 will be arranged approximately in the position shown in Fig. 1. The chain 21 will then be in severe binding engagement with the pipe so that the handle 4 may be forced further downwardly in direction of the arrow to cause the pipe 20 to rotate to couple the same. The teeth 19 on the segment will of course prevent the tongs from slipping around the pipe.

When it is desired to use the implement in connection with pipes smaller in size than the one illustrated in the drawings, the free end of the chain is drawn further through the bifurcation 8 until the chain snugly engages the periphery of the pipe. During this operation, the link 24 will swing on its pivot 17 so that as many links of the chain as possible may engage with the periphery of a pipe to cause a more severe binding action thereon.

The foregoing description and the drawings have reference to what may be considered the preferred, or approved form of invention. It is to be understood that I may make such changes in construction and arrangement and combination of parts, materials, dimensions, etc., as may prove expedient and fall within the scope of the appended claim.

Having thus fully described my invention, what I claim as new and desire to secure by Letters Patent, is:

A pipe wrench comprising in combination a handle, a substantially semi-circular toothed segment secured to the under face of said handle adjacent the free end thereof, the forward edge of said segment being arranged in approximately the same plane with the transverse end of said handle, a chain having an end link pivotally connected to the free end of the handle at a point between the ends of the toothed segment, and means on the upper face of the handle for engagement with the free end of the chain.

In testimony whereof I affix my signature in presence of two witnesses.

THOMAS THOMAS.

Witnesses:
George Bevan,
James Wisely.